United States Patent [19]
Desormeaux

[11] Patent Number: 4,912,499
[45] Date of Patent: Mar. 27, 1990

[54] CAMERA APPARATUS

[75] Inventor: Stephen G. M. Desormeaux, Rochester, N.Y.

[73] Assignee: Eastman Kodak Company, Rochester, N.Y.

[21] Appl. No.: 297,277

[22] Filed: Jan. 17, 1989

[51] Int. Cl.⁴ .............................................. G03B 17/18
[52] U.S. Cl. ................ 354/468; 354/127.12; 354/145.1
[58] Field of Search ................. 354/468, 127.12, 145.1

[56] References Cited

U.S. PATENT DOCUMENTS

| 4,214,827 | 7/1980 | Tominaga et al. | 354/127.12 |
| 4,290,677 | 9/1981 | Baumeister | 354/127.12 |
| 4,607,932 | 8/1986 | Egawa et al. | 354/468 |
| 4,751,546 | 6/1988 | Yamamoto et al. | 354/468 |
| 4,816,862 | 3/1989 | Taniguchi et al. | 354/468 |

FOREIGN PATENT DOCUMENTS 0017942 1/1982 Japan .................................. 354/468

Primary Examiner—Russell E. Adams
Attorney, Agent, or Firm—Roger A. Fields

[57] ABSTRACT

In a photographic camera having a built-in electronic flash, a flash charging indicator, such as an LED, is illuminated whenever the flash capacitor is being charged. If the capacitor is charged for a relatively long time, e.g. 30 seconds, the photographer is alerted by the illuminated indicator of a weak battery condition. According to the invention, the flash charging indicator is additionally used to indicate that the battery source voltage is too low to adequately power a particular camera operation, such as autofocusing. This indication of a weak battery condition is provided at least as long as the particular camera operation is attempted, and it is not dependent on the flash capacitor being charged as in the prior art.

4 Claims, 2 Drawing Sheets

CAMERA APPARATUS

BACKGROUND OF THE INVENTION

1. Field of the Invention

The invention relates generally to the field of photography and particularly to camera apparatus wherein the photographer is alerted if the battery source voltage is too low to adequately power a particular camera operation, such as autofocusing.

2. Description of the Prior Art

An automatic focusing camera having a built-in electronic flash is disclosed in U.S. Pat. No. 4,214,827, issued July 29, 1980, wherein the shutter blades cannot be released if either the power source voltage for activation of the automatic focus adjusting means or the power source voltage for activation of the flash means is lower than a corresponding predetermined voltage level. The predetermined voltage level is one which is sufficient for the automatic focus adjusting means and/or the flash means to enable a correctly focused exposure under various light conditions. When a shutter release button on the camera body is manually depressed to initiate picture-taking, but the shutter blades are not released because the power source voltage is below the predetermined voltage level, the photographer is thereby alerted to change the batteries. A problem, however, is that the photographer may not realize that the shutter blades have not been released. Consequently, an erroneous decision to take a picture may be made.

Another autofocusing camera having a built-in electronic flash includes a light emitting diode (LED) on the camera body which is illuminated whenever the flash capacitor is being charged by battery-powered flash charging or voltage boosting means. The LED is turned "off" only after the flash capacitor is sufficiently charged to fire the flash tube to provide the required flash illumination. Since a relatively long time, e.g. 30 seconds, to charge the flash capacitor indicates weak batteries, the photographer knows to change the batteries if the LED remains illuminated for that time. The problem, however, is that the electrical performance of most batteries is substantially different for flash charging and autofocusing operations, and therefore a long time to charge the flash capacitor may not be an accurate enough measure to determine that the power source voltage is too low for proper autofocusing. Consequently, a picture may not be correctly focused.

SUMMARY OF THE INVENTION

A solution to the above-described problems is provided by the invention.

According to the invention, a flash charging indicator, such as a light emitting diode (LED), is used not only to indicate that the flash capacitor is being charged, but it is used additionally to indicate that the battery source voltage is too low for a particular camera operation, such as autofocusing. The LED remains turned on as long as a shutter release button on the camera body is depressed, if the battery source voltage is too low for the particular camera operation. The photographer therefore is alerted to change the batteries. This warning is obvious to the photographer because it is consistent with the LED remaining on for a long time to charge the flash capacitor, if the batteries are weak.

DETAILED DESCRIPTION OF THE PREFERRED EMBODIMENT

The invention is disclosed as being embodied preferably in a 35mm autofocusing camera having a built-in electronic flash. Because such a photographic camera and flash unit are well known, this description is directed in particular to camera and flash elements forming part of or cooperating directly with the disclosed embodiment. It is to be understood, however, that other camera and flash elements not specifically shown or described may take various forms known to persons of ordinary skill in the art.

Figure 1:
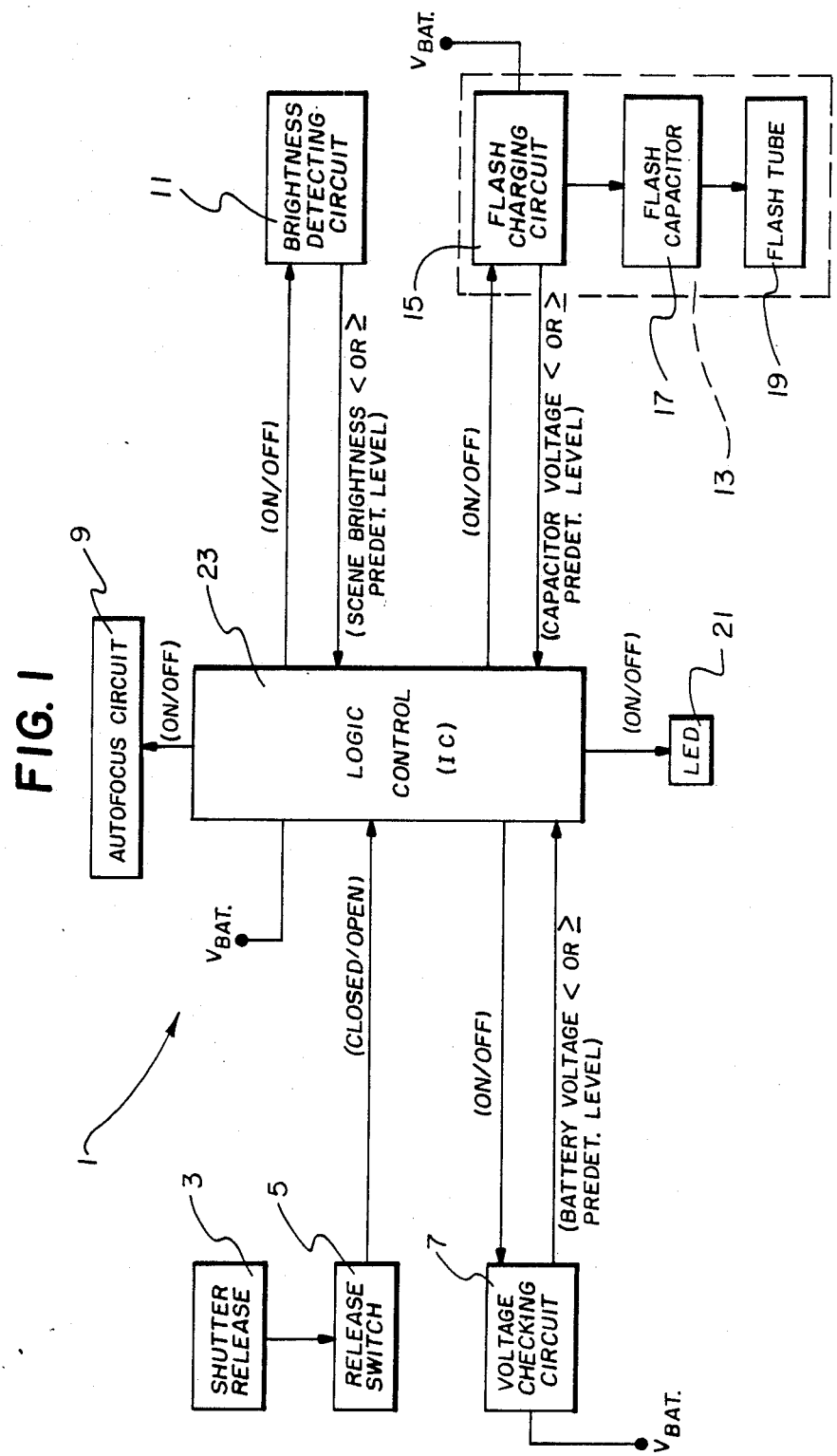
FIG. 1 is a schematic block diagram of camera apparatus including a common indicator for flash charging and weak batteries, according to a preferred embodiment of the invention.

Referring now to the drawings, FIG. 1 is a schematic representation of camera apparatus 1 comprising a manually depressible shutter release 3, preferably a conventional release button; a normally open release switch 5 which is closed when the shutter release is partially depressed; a known battery source voltage checking circuit 7, such as disclosed in U.S. Pat. No. 4,214,827, for determining whether or not the battery source voltage is too low to adequately power a conventional autofocusing circuit 9 as in the cited patent; a conventional brightness detecting circuit 11 for determining whether or not the scene (ambient) brightness is too low for a proper daylight exposure; a conventional electronic flash 13 including a flash charging or voltage boosting circuit 15 as in the cited patent for charging a flash capacitor 17 to fire a flash tube 19; a flash charging indicator, preferably a light emitting diode (LED) 21, which is illuminated whenever the flash capacitor is being charged to provide a visible indication of flash charging; and a known logic control 23, preferably an integrated circuit (IC), having a self-contained permanent program for controlling operation of the camera apparatus.

The shutter release 3 is a two-stage device. That is, it is partially depressed to close the normally open release switch 5, and it must be fully depressed to mechanically or electrically release latch-type means (not shown) which otherwise prevents the camera shutter (not shown) from undergoing an opening and re-closing cycle to take a picture.

Figure 2:
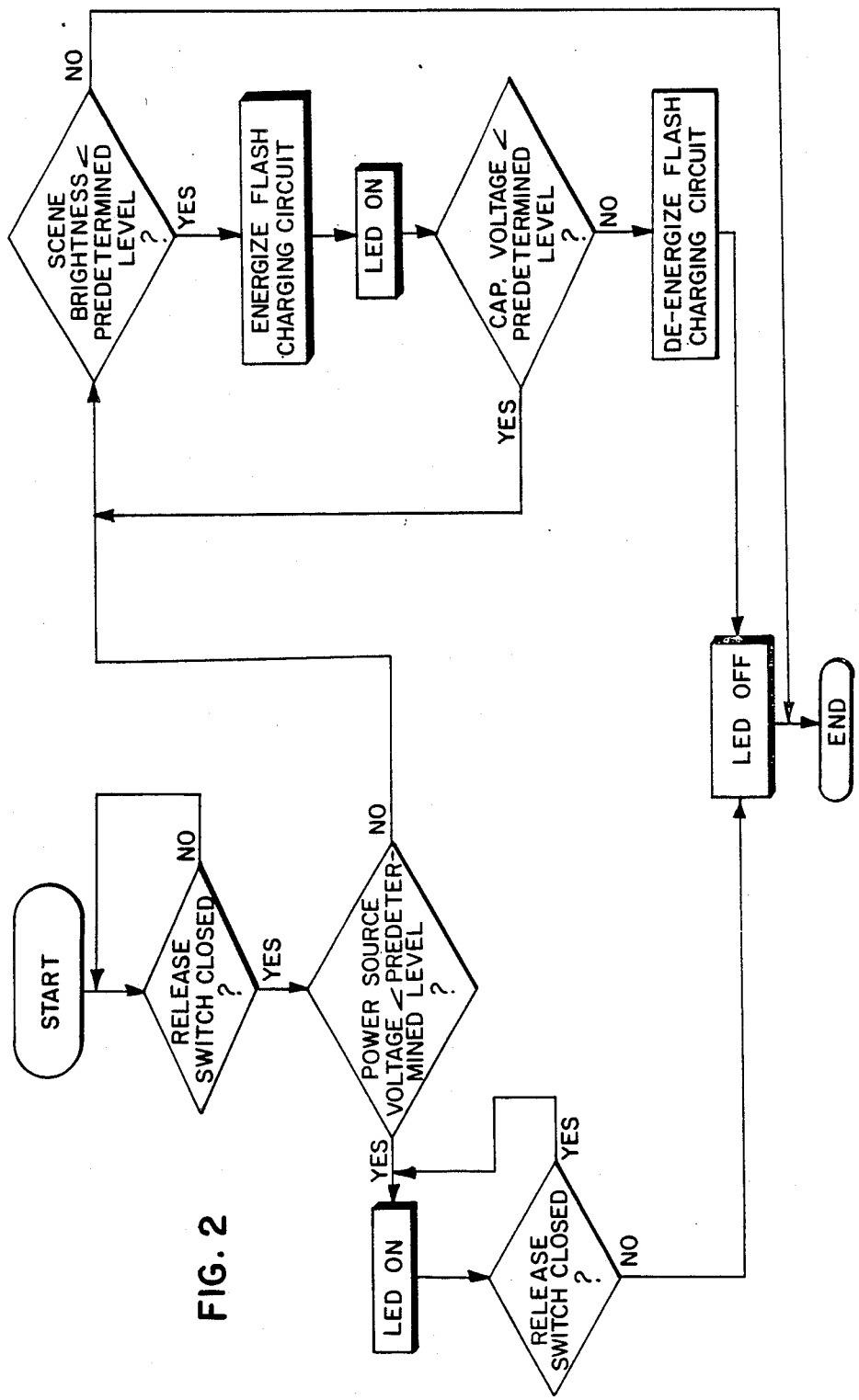
FIG. 2 is a flow chart depicting operation of the preferred embodiment.

Flow Chart - FIG. 2

FIG. 2 is a flow chart depicting operation of the camera apparatus 1.

When the shutter release 3 is partially depressed to close the normally open release switch 3, the logic control 23 is activated to in turn activate the camera electronics including the voltage checking circuit 7 and the brightness detecting circuit 11. Alternatively, activation of all three units can be simultaneous.

The voltage checking circuit 7, preferably via an internal conventional comparator, determines whether the battery source voltage is less than or at least equal to a corresponding predetermined voltage level which is sufficiently high to power the autofocusing circuit 9 to ensure accurate autofocusing. If the battery source voltage is less than the predetermined voltage level, the logic control 23 causes the LED 21 to be illuminated to alert the photographer to change the batteries. As shown in FIG. 2, the LED 21 remains illuminated as long as the shutter release 3 is partially depressed to close the release switch 5.

Conversely, if the battery source voltage is equal or greater than the predetermined voltage level, the brightness detecting circuit 11 comes into play. This circuit 11, preferably via an internal comparator, determines whether the scene brightness is less than or at least equal to a corresponding predetermined brightness level which is sufficiently high for a proper daylight exposure. If the scene brightness is less than the predetermined brightness level, the logic control 23 causes the flash charging circuit 15 to be energized to begin to charge the flash capacitor 17. Also, it causes the LED 21 to be illuminated to alert the photographer of a flash charging cycle. The flash charging circuit 15, preferably via an internal comparator, detemines when the electrical energy stored in the capacitor 17 is at least equal to a corresponding predetermined energy level which is sufficiently high to fire the flash tube 19 to provide adequate flash illumination. When the stored energy in the capacitor 17 reaches the predetermined energy level, the logic control 23 causes the flash charging circuit 15 to be de-energized. Also, it causes the LED 21 to be turned off to alert the photographer that the capacitor 17 is sufficiently charged.

Accordingly, it has been shown that the LED 21 is alternatively illuminated to provide two different indications. The first indication is that the battery source voltage is too low for accurate autofocusing. The second indication is that flash charging is occurring.

The invention has been described with reference to a preferred embodiment. However, it will be appreciated that variations and modifications can be effected within the spirit and scope of the invention. For example, a microcomputer such as typically employed in recent cameras can be substituted for the logic control 23. The microcomputer could include a look-up table having the various predetermined voltage, brightness, and energy levels referred to above. In that instance, of course, there would be no need for a comparator in the voltage checking circuit 7, the brightness detecting circuit 11, and the flash charging circuit 15.

We claim:

1. An improved photographic camera wherein (a) a voltage checking circuit operates to check whether a battery source voltage is too low for a particular non-flash camera operation and (b) an indicator is activatable to provide a visible indication of flash charging, and wherein the improvement comprises:

control means connected to said voltage checking circuit and to said indicator for activating the indicator to provide an additional indication, besides the visible indication of flash charging, that the battery source voltage is too low for the particular non-flash camera operation responsive to the voltage checking circuit making that determination, whereby the indicator can provide two different indications.

2. The improvement as recited in claim 1, wherein said control means prevents flash charging in the event said indicator is activated to provide a visible indication that the battery source voltage is too low for the particular non-flash camera operation.

3. The improvement as recited in claim 1, wherein said control means prevents operation of said voltage checking circuit to check whether the battery source voltage is too low for the particular non-flash camera operation, unless a manual shutter release is first actuated, and it activates said indicator for as long as the shutter release is actuated in the event the battery source voltage is too low for the particular camera operation.

4. An improved battery-powered autofocusing camera wherein (a) a built-in electronic flash has a chargeable flash capacitor and (b) an indicator is illuminated whenever said capacitor is being charged, and wherein the improvement comprises:

control means connected to said indicator for illuminating the indicator even though said flash capacitor is not being charged, whenever a battery source voltage is too low to adequately power an autofocusing operation, whereby the indicator can be illuminated for two different purposes.

* * * * *

UNITED STATES PATENT AND TRADEMARK OFFICE
CERTIFICATE OF CORRECTION

PATENT NO.   : 4,912,499
DATED        : March 27, 1990
INVENTOR(S)  : Stephen G. Malloy Desormeaux It is certified that error appears in the above-identified patent and that said Letters Patent is hereby corrected as shown below:

Title page:

Inventor: delete "Stephen G.M. Desormeaux" and substitute therefor --Stephen G. Malloy Desormeaux--.

Signed and Sealed this

Thirtieth Day of July, 1991

Attest:

HARRY F. MANBECK, JR.

Attesting Officer      Commissioner of Patents and Trademarks